A. H. TINGLEY.
Register-Border.

No. 225,907.  Patented Mar. 23, 1880.

Witnesses:  Inventor:
Albert H. Tingley.
By I. N. Kaeb, Atty.

N. PETERS, PHOTO-LITHOGRAPHER, WASHINGTON, D. C.

UNITED STATES PATENT OFFICE.

ALBERT H. TINGLEY, OF PROVIDENCE, RHODE ISLAND.

REGISTER-BORDER.

SPECIFICATION forming part of Letters Patent No. 225,907, dated March 23, 1880.

Application filed May 10, 1879.

*To all whom it may concern:*

Be it known that I, ALBERT H. TINGLEY, of Providence, in the State of Rhode Island, have made certain new and useful Improvements in Register-Borders; and I do hereby declare that the following specification, taken in connection with the drawings making a part of the same, is a full, clear, and exact description thereof.

Figure 1:
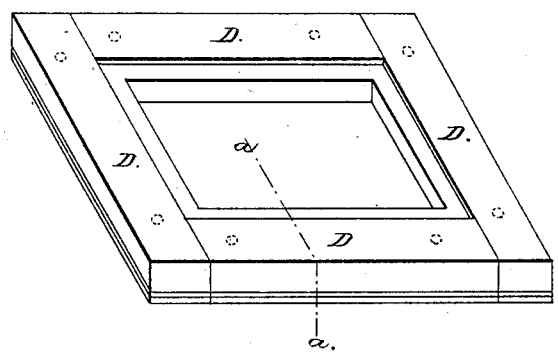
Figure 2:
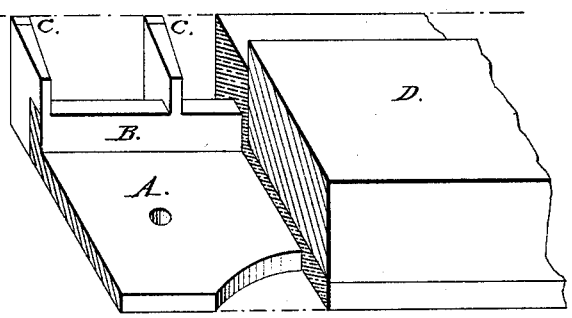

Figure 1 is a perspective view of my invention. Fig. 2 is a cross-section, showing the plate with its lip and lugs and the stone plate.

The object of my invention is to provide a register-border which shall perfectly protect the wood-work from the heat and at the same time combine beauty of appearance and cheapness of manufacture; and it consists in the device hereinafter described.

The register-borders now in use are generally made from a slab of soap-stone or marble, the inner portion being cut out to receive the register. This not only occasions a great waste of material, but requires a great amount of labor in their manufacture, both of which tend to materially increase their cost.

In my invention I make use of an iron plate or frame, A, for the back of the border, which is provided with a lip, B, at right angles to the surface of its several sides, and a series of lugs, C. The lip B and the lugs C serve to retain in place the plaster-of-paris or other non-conducting plastic substance, which is spread and hardens upon the plate A. Upon the outside or face of the frame A, I lay in the plaster strips of marble or soap-stone D, which are retained in place by the adhesion of the plaster and by screws or bolts passing through the frame A. The strips D are rabbeted upon the inner edge to receive the flange of the register-frame.

By the invention which I have described I am enabled to produce a register-border at a small cost and without waste of material or labor and of great strength.

The expense of the strips D is trifling when compared with a slab of the required size, while the labor necessary to remove the inner portion is almost entirely saved.

I am aware that register-borders have been made of two parts having flanges and an intermediate space filled with plaster-of-paris or other similar substance, and I do not claim such; but What I do claim is—

The register-border consisting of the plate A, provided with the lip B, and lugs C, filled with plaster-of-paris or other suitable plastic substance, and forming the inner rim of the register, in combination with the marble or other stone frame D, substantially as set forth.

ALBERT H. TINGLEY.

Witnesses:
WALTER B. VINCENT,
G. M. CARPENTER, Jr.